United States Patent [19]

Pontius

[11] 4,011,416
[45] Mar. 8, 1977

[54] MULTIPLE COLOR LIGHT FREQUENCIES SWITCHED AUDIO MODULATION

[75] Inventor: Frank Pontius, Van Nuys, Calif.

[73] Assignee: Western Geophysical Company of America, Houston, Tex.

[22] Filed: Nov. 6, 1975

[21] Appl. No.: 629,241

Related U.S. Application Data

[63] Continuation-in-part of Ser. No. 500,968, Aug. 26, 1974, abandoned.

[52] U.S. Cl. .................. 179/100.3 K; 179/100.3 A; 179/100.3 B
[51] Int. Cl.² .......................................... G11B 7/20
[58] Field of Search ............ 179/100.3 A, 100.3 B, 179/100.3 K, 100.3 C, 100.3 GN; 352/5

[56] References Cited

UNITED STATES PATENTS

| | | | |
|---|---|---|---|
| 1,675,894 | 7/1928 | Lindridge | 179/100.3 K |
| 2,527,463 | 10/1950 | Sziklai | 179/100.3 K |
| 2,587,219 | 2/1952 | Retinger | 179/100.3 K |
| 3,281,151 | 10/1966 | Kaprellian et al. | 179/100.3 K |
| 3,335,214 | 8/1967 | Goldmark et al. | 179/100.3 A |
| 3,407,272 | 10/1968 | Barocella | 179/100.3 K |
| 3,513,268 | 5/1970 | John | 179/100.3 K |
| 3,855,426 | 12/1974 | Bouwhuis | 179/100.3 K |
| 3,903,360 | 9/1975 | Kamisaka et al. | 179/100.3 K |
| 3,969,593 | 7/1976 | Vlahos | 179/100.3 B |

Primary Examiner—Raymond F. Cardillo, Jr.
Attorney, Agent, or Firm—Norman E. Brunell

[57] ABSTRACT

This invention relates to synchronizing switching systems for modulation of light spectrum frequencies, and a cathode-ray tube apparatus for exposing and simultaneously at electronic speed synchronizing such frequencies onto celluloid light sensitive photographic film. A method for so synchronizing modulating light spectrum frequencies, and for exposing such frequencies on such light sensitive film using a cathode-ray tube light source is related.

4 Claims, 8 Drawing Figures

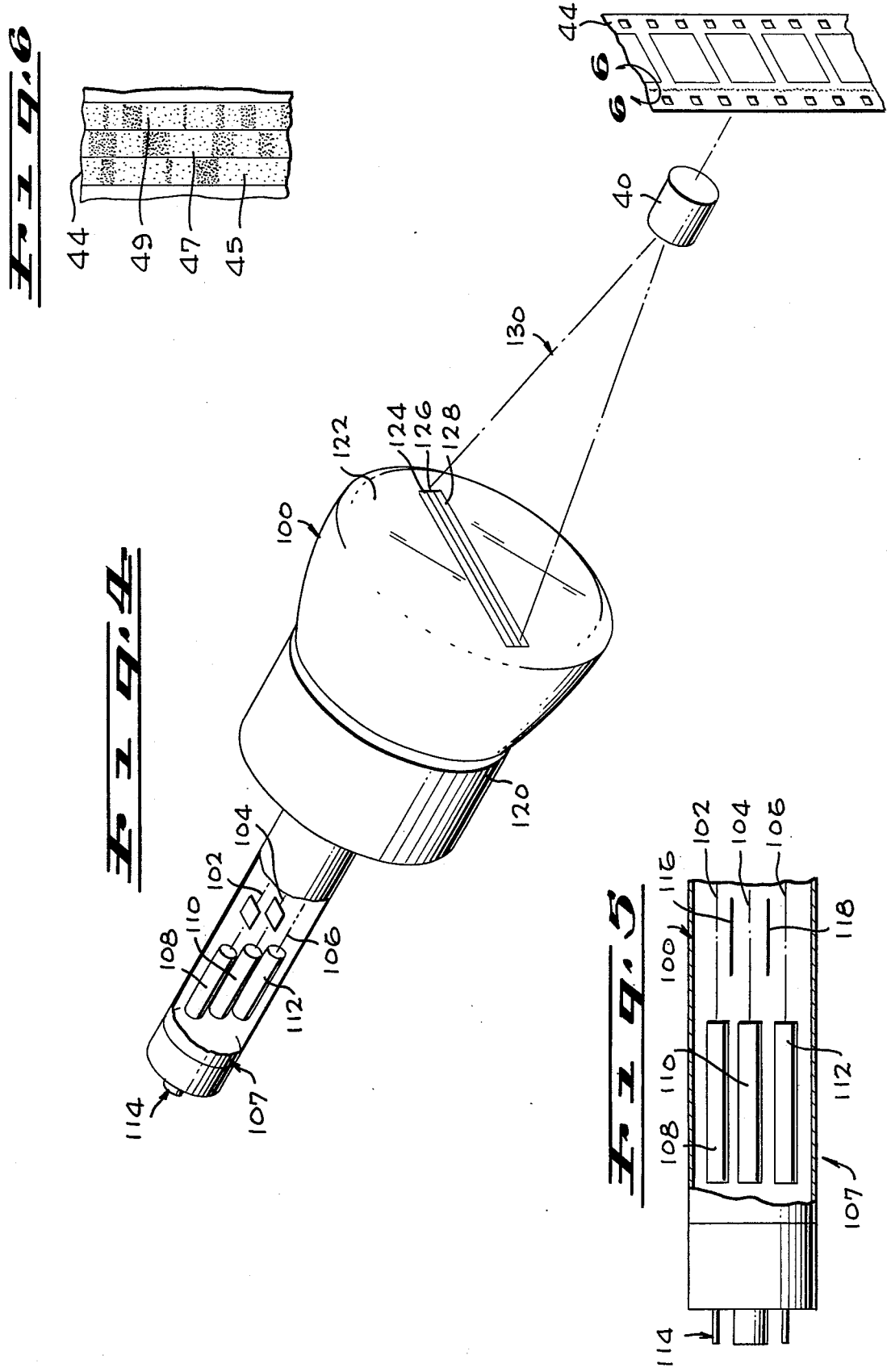

MULTIPLE COLOR LIGHT FREQUENCIES SWITCHED AUDIO MODULATION

This application is a continuation-in-part of application Ser. No. 500,968 filed Aug. 26, 1974 by the same inventor, and now abandoned. All rights of priority resulting from said earlier filed application are claimed herein.

BACKGROUND OF THE DISCLOSURE

It has long been known to associate sound tapes or sound film with motion picture film in a synchronized manner, so that when projecting the motion picture film or tape, corresponding sound can be generated which is coherent and intelligible, and associated with the pictures being presented by the projection of the motion picture film. It has been known before, for example, to have magnetic tape capable of having audio signals implanted thereon, glued, coated or striped on celluloid or other similar light sensitive photographic film having pictures exposed and developed thereon. Hereafter in this specification, the term "photographic film" shall be used to designate any film which when exposed to light frequencies will be permanently altered so as to record the light frequencies so exposed. Such film is typically celluloid and light sensitive, but may be another construction. The term "picture", moreover, shall be used hereafter to designate the image or collection of light frequencies so exposed to, and recorded on such photographic film.

Such photographic film arrangements, however, have proved extremely difficult and expensive to produce. For instance, the magnetic tape which is compositionally different from the typically celluloid photographic film, must be in some way coated on, or made to adhere to the photographic film. The audio must be recorded on the magnetic strip in a separate operation. Additionally, as the composite, tape and film are being processed through the conventional photographic film processing systems, the magnetic tape must be protected so that it will not be scratched or otherwise altered as to its magnetic composition or structure. While the audio fidelity generated from the magnetic tape is extremely high, it can be appreciated that such a process of developing and recording the photographic film and magnetic tape combination is extremely difficult and expensive.

It has long been known to expose audio signals onto such photographic film. At least as early as the 1930's when the talkies motion pictures were in still early stages of technological development, light was modulated by audio frequencies through a light valve, and exposed to such photographic film. In such arrangements, light was directed into a shutter arrangement within the light valve, consisting of a pair of opaque ribbons oppositely disposed to each other on either side of the light path and surrounded by a strong magnetic field. The ribbons were vibrated into and out of the light path by virtue of audio-frequency current fed to the ribbons. The ribbons therefore increased or decreased the amount of light passing through the light valve. The varied density of the light was then exposed to a track on the photographic film.

Such an audio recording has proven to be inadequate in several respects for high fidelity requirements of audio playback. Frequently, the recorded audio track was scratched, so that the pure dark portions of the audio track might have transparent scratches thereon. Frequently, nontransparent dust and other particles were attached to the transparent portions of the audio track at the crucial moment when light was projected through the audio track for the ultimate audio playback in the projecting theatre. Such factors cause undesired variations of the intended light projection, and consequently noise to the audience. Moreover, with age the celluloid film might scratch, deteriorate, tear or wear away so that the audio sound signals ultimately reproduced by the projection of light through the transparent portions of the audio modulated light exposed track were found to be extremely faulty.

Various experiments in such audio modulated light exposed film audio tracks were performed, and occasionally improvements were realized. See for example Frayne, et al., "An Improved 200-Mil Push-Pull Density Modulator," 47 J. Soc. Mot. Pic. Engr., at page 494.

It has long been known to use push-pull electrical signal modulating arrangements in order to eliminate noise, even-order harmonic distortion, and other spurious signals in an electrical signal where signal purity is an important quality. Thus for example, a signal is split, for example, by a transformer, into two equal signals and transmitted to the point of signal pickup or playback. In the signal pickup, the two signals are superposed on each other in electrical phase difference of 180°. In such out-of-phase superimposition, any extraneous, in-phase noise or other undesirable signal finding its way into the modulated signal of the two signals inherently will be canceled. The perfect, desired signal is thereby reproduced. Noises and other spurious signals which find their way onto the parallel signal paths will be canceled by virtue of the superimposition of the 180° electrical out-of-phase transmission.

It has previously been impossible to record such push-pull signals superimposed, on celluloid or similar type light sensitive photographic film using a cathode-ray tube type of light source in synchronized switched order. This invention and my work are to be distinguished from the work performed independently by Petro Vlahos. The work of Petro Vlahos is described in U.S. Pat. No. 3,969,593 issued July 13, 1976. I expressly disclaim being the inventor of the concept or technique of making substantially noise free sound recordings on color film by modulating discrete, selected color light frequencies by the audio frequencies, with two of the light frequency beams modulated in 180° out-of-phase or push-pull relation, and synchronously superimposing the beams to form a common light frequencies beam for exposing the light sensitive film; and I disclaim being the inventor of means for reproducing audio signals from a plurality of such sound tracks by projecting the audio tracks onto a light dividing prism to divide the light into distinct colors which are received by proper photodetectors; which was described by Petro Vlahos to me.

SUMMARY OF THE DISCLOSURE

An apparatus for modulating light spectrum frequencies by audio frequencies in switched and synchronized relationship on tracks on photographic film is taught. In particular, the modulation of discrete, selected color light frequencies by the audio frequencies, and by controlling the modulated frequencies by additional discrete color light frequencies switch signal is described. An apparatus for taking the modulated frequencies and exposing them to light sensitive film in switched and synchronized relationship is shown. The light sensitive film light frequencies pattern is generated by cathode-ray emission tubes, and discrete light frequency emissions can be controlled, modulated and synchronously switched. A method of exposing light sensitive film to such switched, modulated frequencies, and methods of reproducing audio signals from such modulated frequencies exposed on light sensitive film for a multi-track audio frequencies reproduction is explained.

BRIEF DESCRIPTION OF THE DRAWINGS

FIG. 4 is a perspective view of the preferred embodiment of the invention;

FIG. 5 is a detailed elevational view of a portion of the preferred embodiment of the invention;

FIG. 6 is a detailed view of a section of the preferred embodiment of the invention;

DESCRIPTION OF THE PREFERRED EMBODIMENT

Figure 1:
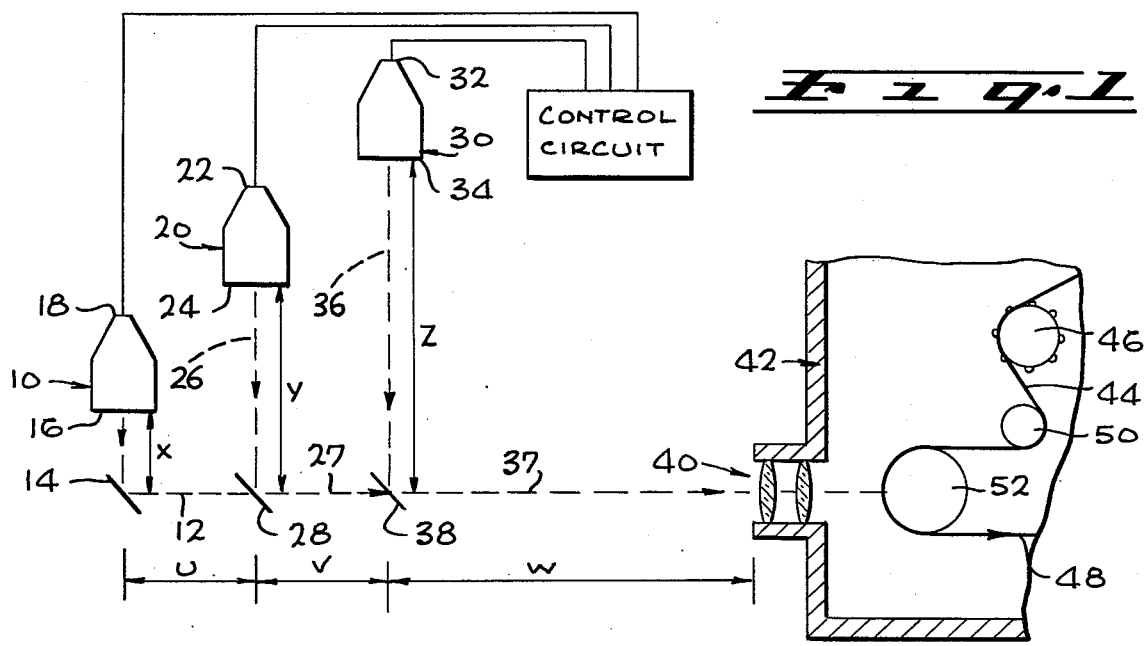
FIG. 1 illustrates an optical schematic showing an embodiment of the invention.

In order to overcome the foregoing disadvantages of present methods, and to provide a push-pull, multiple track light beam modulated by audio frequencies exposable to film track, a modulating arrangement as shown in FIG. 1 is taught. In particular, three cathode-ray tubes are arranged so that the emission from each are directed into a common light beam, and through a lens 40 are exposed onto passing film. A cathode-ray tube 10 specially designed to emit only light frequencies in one color, for example red, is arranged at a specified distance X from Inconell mirror 14, which completely reflects the light beam 12. Cathode-ray tube 10 has a screen 16 having phosphorous light emitting material coated thereon. Thus, when electron energy is emitted from the gun 18 in an electron beam, the electrons strike the phosphorous of the screen 16 and emit substantially light in the, for example, red frequency in light beam 12.

Similarly, cathode-ray tube 20 is positioned adjacent cathode-ray tube 10. Cathode-ray tube 20 has a gun 22 and screen 24. The screen 24 is coated with a dissimilar phosphorous material so that when the electron beams emitted from gun 22 strike the screen 24, essentially a second light frequency beam 26, for example green, is directed from the tube 20. The green light frequencies beam 26 strikes dichroic mirror 28 to reflect the beam 26 into beam 27. Dichroic reflecting mirror 28 is specially designed to reflect only light frequencies in the, in this example, green spectrum, and specifically to pass directly therethrough light frequencies in the red spectrum. Thus, the light beam 12 is passed directly through the mirror 28 and the light beam 26 is specifically reflected by the mirror 28, to form light beam 27 having light in the red and in the green frequencies only. The screen 24 of cathode-ray tube 20 is specifically set so that it is at a distance Y from the dichroic mirror 28. The distance Y will be explained in detail below, in association with distance X.

Similarly, cathode-ray tube 30 is positioned adjacent the cathode-ray tube 10, 20. Cathode-ray tube 30 is equipped with an electron beam emitting gun 32 and screen 34. Screen 34 is coated with a phosphorous material dissimilar to the aforementioned phosphorous material emitting substance so that when the electron beam from gun 32 strikes the screen 34, a light beam 36 in a third light frequencies spectrum, for example blue, is emitted. The screen 34 is positioned a precise distance Z from dichroic mirror 38. Dichroic mirror 38 is specially designed to reflect light in the, in this example, blue frequencies spectrums and to transmit light in the red and green light frequencies spectrums. Thus, the dichroic mirror 38 reflects the light from beam 36, and passes the light from beam 27 to form light beam 37 having light in the blue, red and green light frequencies spectrums.

Sources of the light frequencies must be equidistant from the point at which they are to be imaged. Thus, the sum of distances X+U+V+W equals the sum of distances Y+V+W, and equals the sum of distances Z+W. Each of the light frequencies red, green and blue can therefore be sharply imaged at the desired point such as the film 44, from their associated source screens.

The light beam 37 containing the red, green and blue light frequencies spectrum is then passed through lens 40. Lens 40, typically, could be a 50:1 reduction ratio lens obtainable within the film industry. Lens 40 is positioned as a window to camera 42 having film moving mechanisms therewithin. The film 44 comes from a film magazine or reel, not shown, to the sprocket wheel 46. Typically, film 44 is moved by sprocket wheel 46 in the direction of the arrow 48 as shown. The film 44 can then pass around pulley 50 and around drum 52, thus exposing the film 44 to the light beam 37 passing through the lens 40. The film 44 is then fed onto a film magazine or reel, not shown. The cathode-ray tubes 10, 20, 30 emit light in the respective frequencies corresponding to the color of the phosphorous screens of each tube. At least for two of the cathode-ray tubes 10, 20 as in the embodiment shown in FIG. 1 the electron beam emissions causing such tube emissions, are to be modulated by audio frequencies.

Figure 2:
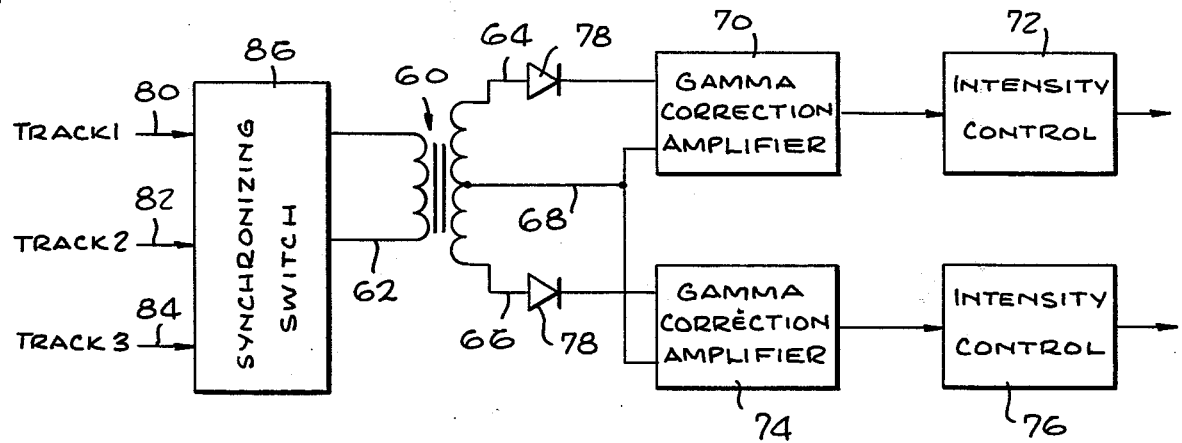
FIG. 2 shows an electrical schematic diagram of a portion of the invention.

The modulation of the emissions coming from the guns 18, 22 can be controlled by an audio modulating, push-pull electrical control arrangement as shown diagrammatically and schematically in FIG. 2 of the drawings. Thus, for example, a signal developed by ordinary frequencies within the audio or hearing range can be conducted to transformer 60 by lead 62. The audio signal in lead 62 is transformed into two audio signals, one each respectively in leads 64 and 66. The signal in lead 66 is exactly 180° out-of-phase with the signal in lead 64, by virtue of the transformer 60, having a common lead 68 between the leads 64, 66. The audio signal in leads 64, 68 is transmitted to gamma correction amplifier 70. The audio signal from the gamma correction amplifier 70 is coupled to apparatus 72 for controlling the intensity of the electron beam gun 18 of the cathode-ray tube 10. In such a manner, the electron beam emitted from the gun 18 is modulated by the audio frequency transmitted through the leads 64, 68.

Similarly, the audio frequency passing through the leads 66, 68 is delivered to the gamma correction amplifier 74. The audio signal corrected by the amplifier 74 is coupled with the gun intensity control apparatus 76, which controls the intensity of the electron beam emitted by the gun 22. In such a manner, the electron beam emitted from the gun 22 is modulated by the audio signals transmitted through lines 66, 68.

As noted above, however, the audio signals in leads 66, 68 are 180° out-of-phase from the audio signals transmitted in leads 64, 68, by virtue of the center tap of common lead 68 in the transformer 60. Thus, the audio signals modulating light beam 26 are the same as, but exactly 180° out-of-phase with the audio signals carried by the light frequencies of the beam 12. As might be appreciated by those skilled in the art, when the green light frequencies of beam 26 are precisely and synchronously superimposed on the red light frequencies of beam 12, a common light frequencies beam 27 is established containing the audio modulated green light frequencies and the audio modulated red light frequencies within it. It is this beam 27 which constitutes the audio signal ultimately exposed to the film 44 in the camera 42. In the push-pull amplifier arrangement of FIG. 2, diodes 78 can be inserted into the leads 64, 66 so as to produce a form of signal commonly known as Class B push-pull. In this form typically, leads 64, 68 would carry the positive portion of the audio signal only, while the leads 66, 68 would carry only the negative portions of the same audio signal.

The lead 62 shown in FIG. 2 may very well transmit a multiplicity of audio signals to be modulated onto the various light frequencies. So, for example, in normal motion picture producing for commercial film theatre showing, it is customary in the trade to have the audio playback in three tracks. One track normally contains the normal right channel of a stereophonic sound recording system. A second track normally carries the audio signal of a left track of a typical stereophonic sound system. A third track, frequently containing a very wide physical displacement of speakers about the projecting theatre, is normally called a center track and contains sounds compositely from the right and left stereophonic audio signals and frequently contains sound independent of the right and left audio signals. In any event, all of the audio signals from the multiplicity of input tracks can be synchronously switched by a scanning apparatus to produce three segments or audio tracks containing signals to be transmitted over the common lead 62. In FIG. 2, a typical three track arrangement is shown having a first track 80, a second track 82 and a third track 84 having respective inputs into a synchronizing switch apparatus 86 which synchronizes the audio signals for transmission to the transformer 60 through leads 62. The signals in the three tracks 80, 82 and 84 are transmitted in common lead 62, first from track 80, then from track 82, then from track 84, then from track 82, then from track 80, then from track 82, then from track 84, etc. The purpose of this sequence is to be explained later in detail.

Figure 3:
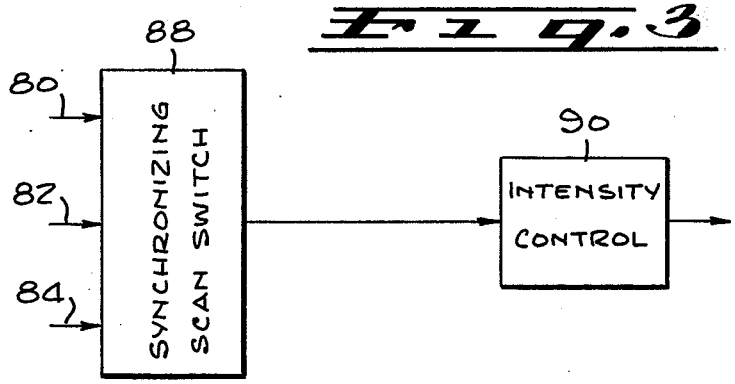
FIG. 3 shows an electrical schematic of yet another portion of the invention.

The signals transmitted through leads 64, 66 to the respective cathode-ray tubes 10, 20 each contain synchronized segments from all of the three tracks. It is necessary, therefore, to have a control apparatus for segregating the signals from each of the light frequencies beams 12 and 26. The blue cathode-ray tube 30 can be used as a control device. The light frequencies 36 emanating from the cathode-ray tube 30 contain modulating signals which in the ultimate projector, which will be described in further detail below, will so segregate the synchronized audio signals, compositely contained in each of the light beams 12 and 26. As shown in FIG. 3, the signals controlling, or capable of segregating the audio signals into their proper, respective tracks are put into the synchronizing scanning switch 88. The signal from scanning switch 88 is coupled to the apparatus 90 capable of controlling the intensity of the gun 32 in the cathode-ray tube 30. Thus, the control signals collected in the scanning switch 88 are modulated onto the blue light frequencies beam 36, and are ultimately combined into the light beam 37 exposed to the film 44 in the camera arrangement 42, as explained in detail above.

It is contemplated that the above-identified invention can be simplified so that only one cathode-ray tube is required. For obvious economical and technical reasons, such a one cathode-ray tube light emitting arrangement would appear to be the most desirable, and consequently the preferred embodiment of the invention. One version of such a single cathode-ray tube 100 is shown diagrammatically, reference being had to FIG. 4 of the drawings. A cathode-ray tube 100 could either have a single gun or have several guns capable of emitting three electron beams 102, 104 and 106. One such gun arrangement could include three electron beam guns, one gun each for emitting beams separately through red, blue and green emitting material, shown respectively in FIG. 4 as guns 108, 110 and 112. The gun arrangement in the alternative, could consist of one gun having the three discrete electron beams, 102, 104 and 106. One version of the gun arrangement can be seen in more specific detail in FIG. 5 of the accompanying drawings, wherein the guns 108, 110 and 112 are shown within the neck of the envelope of the cathode-ray tube 100, having the typical input lead arrangement 114. The tracking of the various beams can be maintained by control of the voltage on the plates 116 and 118.

The cathode-ray tube 100 can be fitted with the normal deflection coil 120 and a screen 122. Screen 122 preferably has strips of phosphorous or other emitting materials on it, one strip of phosphorous material 124 capable of emitting red light frequencies when struck by the electron beam from the gun arrangement 107, a second containing phosphorous material 126 capable of emitting green light frequencies when struck by the electron beam from the gun arrangement 107, and one strip of the phosphorous material 128 capable of emitting blue light frequencies when struck by the electron beams emanating from the gun arrangement 107. The light frequencies emanating from the cathode-ray tube 100, as explained above, must be synchronized into a common, light superimposed synchronized light frequencies beam 130 for the exposure through a camera, not shown in the drawing of FIG. 4, onto a film 44. The film 44 typically has three discrete light sensitive tracks 45, 47, 49 for the distinct and separate exposure of the discrete light frequencies beams.

Figure 7:
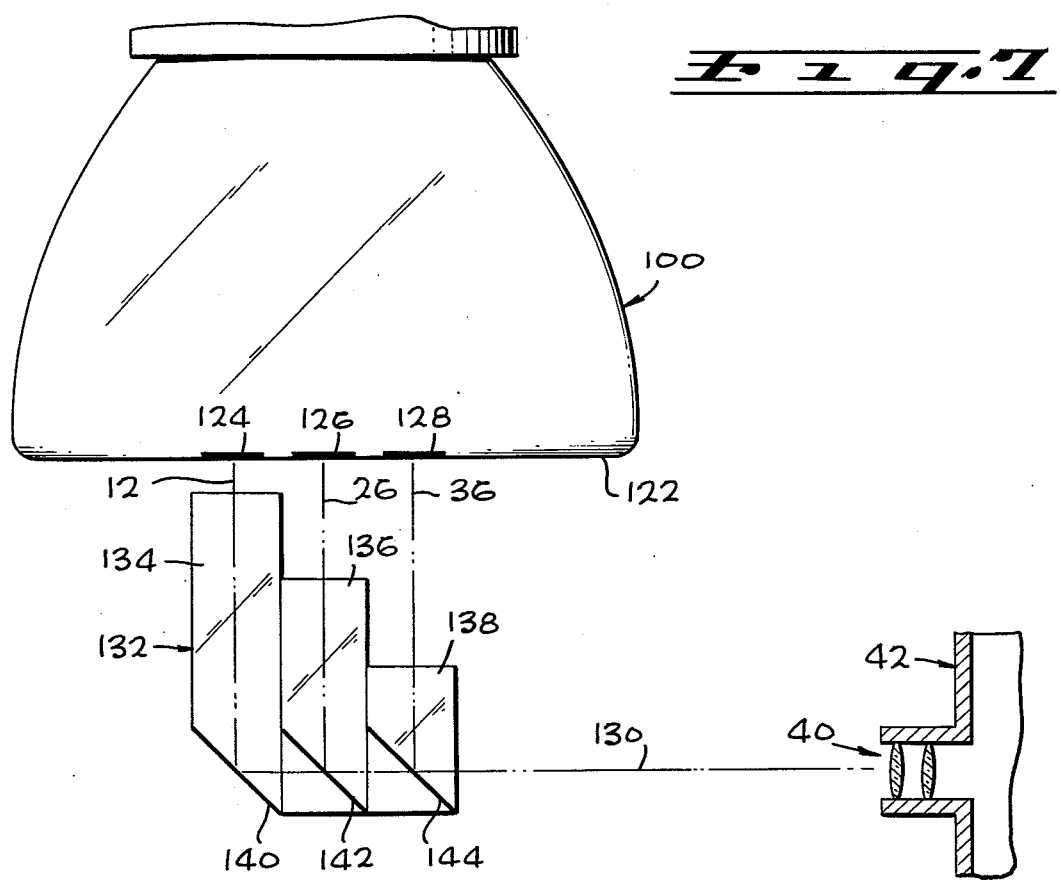
FIG. 7 is an optical schematic of the preferred embodiment of the invention.

In FIG. 7, the apparatus in the context of its environment for superimposing the discrete light frequencies beams into a common light frequencies beam is shown in more detail. Like numbers will be used to designate like parts of the total apparatus shown in the related drawings of FIGS. 1 and 4. Thus, reference numeral 42 will be used to denote the camera containing window lens 40 having a light reduction or concentration ratio 50:1, typically. Cathode-ray tube 100 is shown having screen 122 having phosphorous strips 124, 126 and 128 positioned on the screen. Light beam 12 emitted by the red phosphorous material strip 124 is directed into the glass prism 132 at section 134. Light beam 26 substantially consisting of green light frequencies transmitted by the phosphorous strip 126 is conducted to the glass prism 132 at section 136. Light beam 36 consisting primarily of blue light frequencies is transmitted from the blue phosphorous strip 128 into the glass prism 132 at section 138. The glass prism 132 consists of varying length sections 134, 136 and 138.

The varying lengths of the glass prism are merely used to take advantage of the fact that light travels slower in a glass medium. The phosphorous strips 124, 126 and 128 are located on screen 122 which is a flat surface. The signal modulated on the electron beam must be imaged as a common point, as previously described. The component parts of prism 132, i.e. sections 134, 136 and 138, are so constructed as to yield air-glass paths for the transmitted light frequencies beams 12, 26 and 36 of exactly equal length measured from the point of image, the film 44.

The glass prism 132 consists also of Inconell mirror 140, and dichroic reflectors 142 and 144. Inconell mirror 140 completely reflects in this example, the red light frequencies transmitted through the segment 134 of the prism 132, into the full light frequencies spectrum 130. Dichroic reflector 142 completely reflects the green modulated light frequencies of beam 26, while passing completely the audio modulated red light frequencies reflected by mirror 140 in this example. Similarly, dichroic reflector 144 in this example completely reflects the signal modulated blue light frequencies of beam 36 into the common, full frequencies spectrum beam 130, while completely passing the audio modulated light frequencies in the red and green frequencies spectrums from the mirror 140 and the reflector 142.

Figure 8:
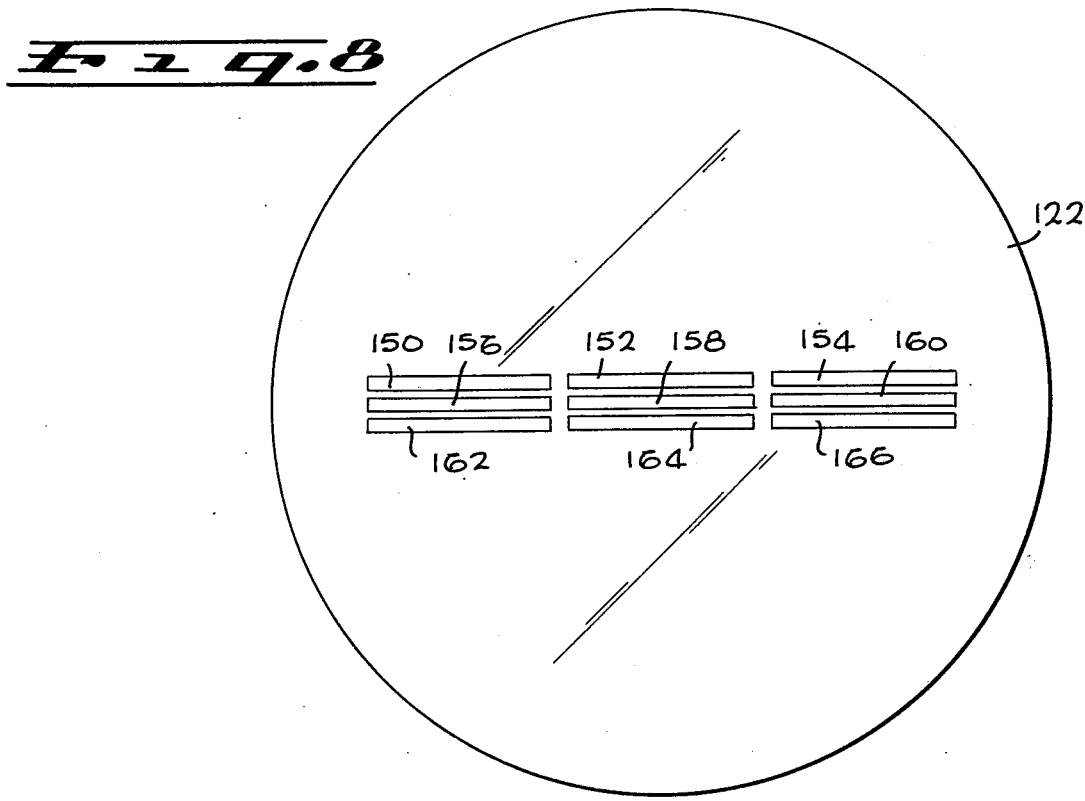
FIG. 8 is a detailed view of a section of the preferred embodiment of the invention.

The common beam 130 may be divided into three discrete full spectrum beams, one each corresponding to the first, second or third tracks 80, 82, 84 of FIG. 2 of the drawings, if a typical three track system is being utilized. In FIG. 8 of the accompanying drawings, the screen 122 can be seen in greater detail wherein the discrete tracks are obtained by virtue of the slits coordinated by the synchronizing switch apparatus 86 shown in FIG. 2 of the drawings and described above. Thus, emanating from the electron cathode-ray tube 100 are no less than nine discrete light beams if a three track audio arrangement is desired. Of course, additional tracks or fewer tracks as desired can be obtained by providing the required number of slits on the screen 122. The color distinctions are superimposed on one another into the common beam 130. However, the discrete beams, one for each of the three tracks as shown in the preferred embodiment, remain distinct and are exposed onto the film 44 discretely, so that one track of the audio signal, representatively 80, is exposed only on one track 45 of the celluloid film. Film tracks 47, 49 are exposed to beams modulated by audio tracks 82, 84 respectively.

The phosphorous strip as can be appreciated, extends beneath each of the three tracks for that color. Thus for example, beams emanating from slits 150, 152 and 154 emanating from the red phosphorous material 124 on the screen are derived as the electron beam 102 scans across the screen 122 by first turning on audio signal 80. Then when the electron beam has scanned one-third of the distance across screen 122, audio signal 80 is turned off and simultaneously audio signal 82 is turned on for the next one-third of the scan. For the last one-third of the scan, audio signal 82 is turned off and audio signal 84 is turned on. Similarly, beams emanating from slits 156, 158 and 160 emanating from the green phosphorous emitting material 126 on the screen 122 are formed by similarly switching beam 104. Similarly, beams emanating from slits 162, 164 and 166, emanating from the blue phosphorous strip 128 are formed by similarly switching the beam 106 in FIG. 5 of the drawings. It can readily be appreciated that additional tracks can be provided if additional audio input tracks are available, or if it is desired to produce additional tracks for theatre reproduction.

It can be appreciated that the light system as described in the foregoing description provides an apparatus for modulating a multiplicity of audio signals onto discrete light frequencies beams. Moreover, these discrete light frequencies beams can be accumulated into a full spectrum light frequencies beam, divided only by the number of discrete audio signal tracks desired to be implanted. Further, the full light frequencies beams can be exposed to ordinary celluloid type photographic film, or for that matter any light sensitive film which can retain the intensity of the light exposed thereto. In such a manner, a multiplicity of audio tracks can be implanted on a corresponding multiplicity of celluloid, light sensitive film tracks, and the necessity of having discrete magnetic tracks or the like spliced, striped or glued onto the photographic film is eliminated. Moreover with the apparatus as described in this invention, the requirement for complicated light valves and for the restriction to single, light frequencies or black and white type audio modulation implanted on photographic film has been eliminated.

The film 44 produced with the multiplicity of audio tracks modulating light frequencies intensities exposed to the film 44 can be projected in an ordinary commerical theatre projection apparatus with a minimum of difficulty. The projecting light is shown through the film to project the images or pictures which are contained on individual frames of the film 44 onto the typical, standard commerically constructed theatre projection screen for an audience to view. Light also can pass simultaneously through the discrete tracks 45, 47, 49 existing on the side of the film 44, as shown in detail in FIG. 6 of the accompanying drawings. Proper photodetectors, or photocell transducers on the opposite side of the thus projected film will receive the light filtered through the discrete audio tracks. Each of the audio tracks is projected onto a light dividing prism, or similar device which divides the full spectrum light into three discrete light frequencies spectrums, a red frequencies spectrum, a green frequencies spectrum, and a blue frequencies spectrum. The red frequencies spectrum, and the green frequencies spectrum, since they were exposed to the film as being modulated by the audio frequencies, will have the audio frequency signals implanted or modulated on each of them. The control signals, likewise, are modulated onto the blue light frequencies spectrum. Thus, the blue light frequencies spectrum can be demodulated, and the signal can be used to switch or to control the demodulated audio signals coming from the green light frequencies spectrum and the red light frequencies spectrum of the separate film tracks. If any of the film tracks 45, 47, 49 should be scratched, or if dirt or other impurities should be found on the track at the instant that the light is projected through the film, the noise created by such impurities or scratches will be found on both the red light frequencies spectrum modulated signal and on the green light frequencies spectrum modulated signal. Since the red light frequencies spectrum light beam and the green light frequencies spectrum light beam are exactly 180° out-of-phase with each other, the noise thus created by the impurities or the scratches not being 180° out-of-phase, is canceled completely when the two color light frequencies signals are reconverted to be in phase with each other. The sound, however, will be preserved and combined into a signal audio signal for each track, which signal is then transmitted to the loudspeakers corresponding to the particular track. In such a manner, a superior audio signal with a high degree of fidelity not heretofore known can be created.

It can be appreciated that further modifications of the above-described invention can be made, and thus the scope of the invention should be determined only by the following claims.

I claim:

1. A photographic film exposure apparatus including means for exposing a plurality of light frequencies on a photographic film, comprising:
   a. means for emitting a distinct light beam having a differing color light frequency from each of a plurality of charged particle beams emitted by respective sources, said means including at least one cathode-ray tube source;
   b. a plurality of independently variable signals simultaneously received by said apparatus;
   c. means for sequentially modulating each one of said plurality of signals onto a first said particle beam and the light beam emitted therefrom;
   d. means for synchronously modulating the same said each one of said plurality of signals on a second said particle beam and the light beam emitted therefrom, in the opposite electrical phase relative to the first said light beam modulated by the same said signal;
   e. means for exposing photographic film including a plurality of distinct light sensitive tracks to said at least two differing colors light frequencies beams for each said signal superposed as a light frequencies beam, whereby each said light sensitive track is exposed to said superposed beam at the instant it has a corresponding selected one of said signals simultaneously received modulated thereon.

2. The exposure apparatus as claimed in claim 1 further comprising means for modulating a further signal discrete from said plurality of said signals on a third said particle beam and the light beam emitted therefrom.

3. The exposure apparatus as claimed in claim 1 wherein said distinct light beam emitting means comprises at least three cathode-ray tube generated charged particle beams.

4. The exposure apparatus as claimed in claim 3 wherein said distinct light beam emitting means comprises at least three cathode-ray tubes.

* * * * *